US005235162A

United States Patent [19]

Nourbakhsh

[11] Patent Number: 5,235,162

[45] Date of Patent: Aug. 10, 1993

[54] PLASMA PILOT ARC IGNITION SYSTEM

[75] Inventor: Farhad Nourbakhsh, Watertown, S. Dak.

[73] Assignee: Tescom Corporation, Elk River, Minn.

[21] Appl. No.: 889,047

[22] Filed: May 26, 1992

[51] Int. Cl.[5] .............................................. B23K 9/00

[52] U.S. Cl. ......................... 219/121.54; 219/121.57; 219/121.39; 219/121.44

[58] Field of Search ..................... 219/121.54, 121.57, 219/121.39, 121.48, 121.55, 75, 121.44, 121.59

[56] References Cited

U.S. PATENT DOCUMENTS

| | | | |
|---|---|---|---|
| 4,280,042 | 6/1981 | Berger et al. | 219/121.57 |
| 4,324,971 | 4/1982 | Frappier | 219/121.54 |
| 4,689,463 | 8/1987 | Shubert | 219/76.16 |
| 5,086,205 | 2/1992 | Thommes | 219/121.54 |

*Primary Examiner*—Mark H. Paschall
*Attorney, Agent, or Firm*—Clayton R. Johnson

[57] ABSTRACT

Upon energization of the control unit, it operates a switch to supply air in a gap between the cutting nozzle and the electrode of a plasma torch, a second switch to apply a high voltage from a high voltage DC (direct current) power supply unit at the gap to initiate a starting arc, a third switch to energize a low voltage direct current power supply unit, and a fourth switch in circuitry for applying from the low voltage power supply unit, a low voltage across the cutting nozzle and the electrode to establish a pilot arc after the high voltage has been applied across the gap and after the establishment of the pilot arc and upon moving the head of the torch sufficiently closely adjacent to the a workpiece, establish a main arc between the electrode and the workpiece. Preferably the high voltage is applied for only about 0.25–0.5 seconds and the low voltage applied across the cutting nozzle and the electrode for about 3 second. The high and low voltage supply units are connected in parallel with the fourth switch, a pilot resistor and a high voltage diode connect in series across the positive terminals of the high and low voltage units.

16 Claims, 1 Drawing Sheet

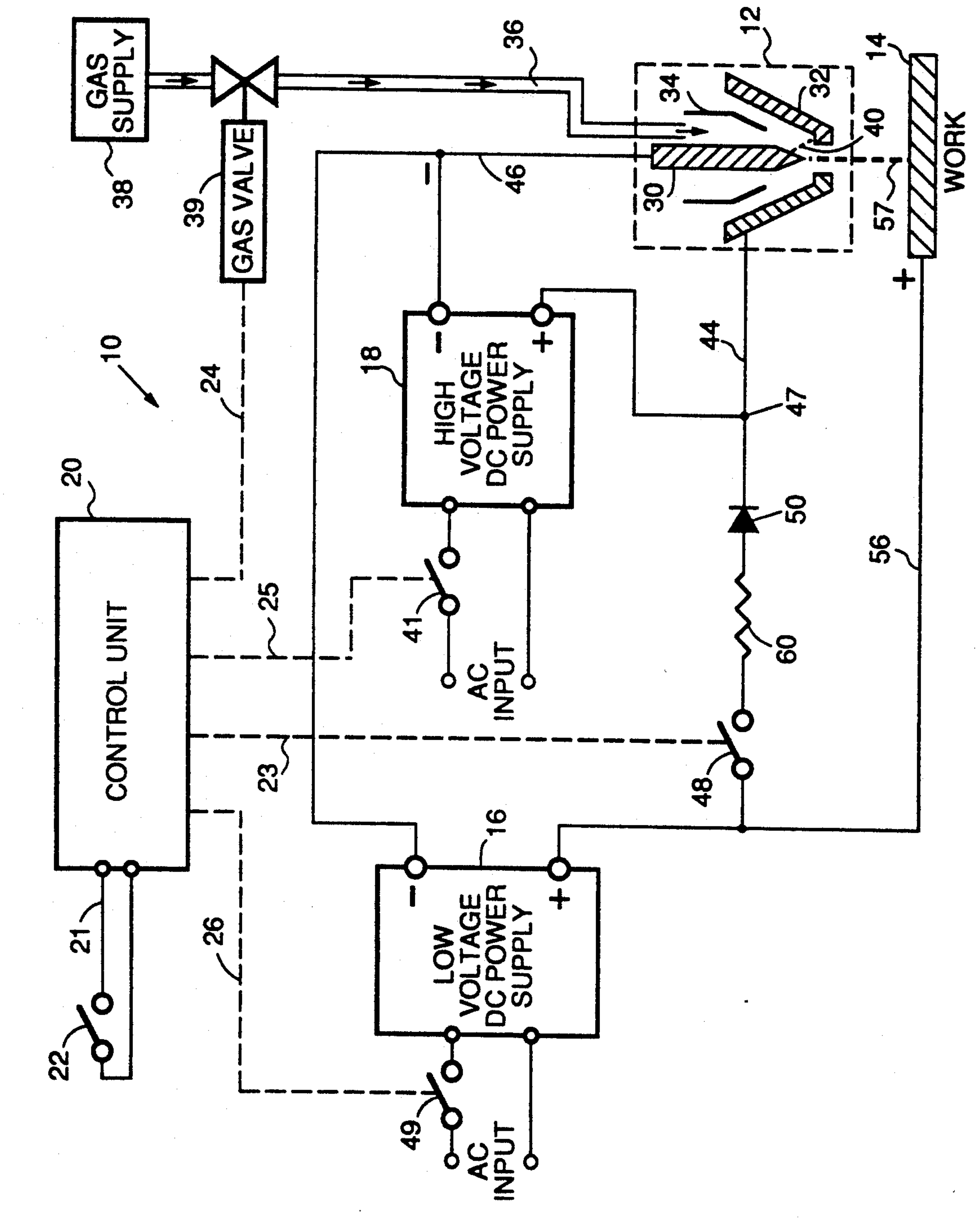
GAS SUPPLY
GAS VALVE
CONTROL UNIT
HIGH VOLTAGE DC POWER SUPPLY
LOW VOLTAGE DC POWER SUPPLY
AC INPUT
AC INPUT
WORK

PLASMA PILOT ARC IGNITION SYSTEM

BACKGROUND OF THE INVENTION

This invention relates to a particular method and apparatus for starting and maintaining an arc in a plasma type gas arc cutting or welding system.

Plasma cutting systems utilize a high speed stream of hot ionized gas to melt and cut electrically conductive metals. Such systems operate by forcing a gas such as compressed air through a narrow orifice at the end of the plasma torch. Plasma gas first flows between the electrode and cutting nozzle inside of the plasma torch. In order to ignite this gas inside of the torch head, a high voltage spark must be generated between the electrode and the cutting nozzle to form a pilot arc. Once this spark is generated, the main plasma power supply maintains the resulting pilot arc which can then be transferred as a main arc to the metal to be cut. Thus, to start the cutting process, a weak pilot arc is needed to generate a path for electricity to be conducted from the plasma torch to the metal under cut.

Typically in a plasma cutting system some form of high voltage, high frequency pulse is used to generate a spark inside the torch to ignite the pilot arc. This is normally accomplished by the use of a high voltage transformer, a set of spark gaps and a high voltage coupling coil. Other systems use a high frequency, high voltage solid state device to generate the pilot arc.

These prior art systems generate large amounts of high frequency, high voltage electromagnetic waves that can cause electrical interference with other electrical equipment in the area. The spark gap system also has the disadvantage of requiring periodic maintenance to adjust the gap distance and/or replace the points forming the spark gap.

In order to minimize or overcome problems such as the above this invention has been made.

SUMMARY OF THE INVENTION

In the system disclosed herein a high voltage DC (direct current) power supply is connected between the electrode and the cutting nozzle. This high voltage supply is energized for a split second, for example 0.25–0.5 seconds, to generate a relatively weak spark in the gap between the nozzle and the electrode inside of the torch head, there being a flow of gas through the gap prior to the spark being generated. At the time the spark is generated the pilot switch has been closed and current from the main power supply which has a lower voltage potential of about 200 to 300 volts DC (direct Current) flows through a high voltage blocking diode and to the torch. This current which is generally about 10 to 20 amps generates an intense pilot plasma arc which lasts for a predetermined period of time, and then the pilot switch opens. If the torch head is moved sufficiently near the metal surface to be cut, and if the pilot switch is still closed, the plasma arc is further intensified by the higher current from the main power supply to provide the main (cutting) arc.

The function of the high voltage diode is to block the flow of high voltage energy from the high voltage, low current, power supply to the lower voltage main power supply and hence reduce the load on the high voltage power supply. The high voltage power supply is turned off within 0.25 to 0.5 seconds of start of the pilot arc, the pilot switch opens within a predetermined period of time, about 3 seconds. The main cutting arc usually starts prior to the opening of the pilot switch. The entire process is repeated each time a new cut is to be made.

As the system uses DC (direct current) high voltage, the electrical interference due to high frequency pulses is eliminated. Also, as the system herein described utilizes the direct current high voltage supple for about 0.25–0.5 seconds in generating the spark to initiate the pilot arc, it is for only this period that any form of possibly undesireable electrical interference is generated by the system.

It is a main object of the invention to provide a new and improved method and apparatus for starting and maintaining an arc in a plasma type arc cutting or welding system.

BRIEF DESCRIPTION OF THE DRAWINGS

The drawing shows the plasma pilot ignition system of this invention which can be utilized to practice the method of the invention, portions of the torch head being diagrammatically illustrated.

Referring to the drawing, there is shown a plasma cutting torch system, generally designated 10, that has a moveable cutting torch 12 which may be manually moved by an operator to a position in proximity to a stationary workpiece 14 to perform a cutting operation or a welding operation thereon.

The torch system has an operating circuit which includes a low voltage DC (direct current) power supply unit 16, a DC (direct current) high voltage power supply unit 18, and a control unit 20. The control unit includes a timing circuit (not shown) for controlling the electrical control switches 39, 41, 48 and 49 between their open and closed positions in the sequence set forth hereinafter.

The operating circuit includes a manually operated switch 22 in one of the input lines 21 for supplying the start signal to the control unit 20. Switch 22 is of the normally open push button type and preferably is resiliently urged to an open position whereby the operator has to manually retain the switch in its closed position. Advantageously switch 22 may be the same as the trigger switch and the interlock switch connected in series and mounted on the torch handle (not shown) such as indicated in my U.S. Pat. No. 5,039,837. The closing of the switch 22 by an operator or an automated machine (not shown) energizes the control unit 20 and thereby serves as a starting signal to initiate a predetermined cycle of operation for the control unit. The control unit 20 has four output lines 23, 24, 25 and 26 and means (not shown) for generating the referred to cycle of operation which has phases thereof outputted to the output lines 23, 24, 25 and 26.

The torch 12 may be the same as that disclosed in my U.S. Pat. No. 5,039,837. For purposes of describing the invention, a simplified version of the torch will now be set forth. The torch 12 comprising an electrode 30 and a surrounding cutting nozzle 32. Between nozzle 32 and electrode 30, in surrounding relation to electrode 30, is a sleeve 34 which provides in cooperation with electrode 30 an annular space for the flow of air or other gas used to flow through and exit from the nozzle 32. Thus the head of the torch includes the nozzle, electrode and sleeve.

The gas is admitted to the interior of sleeve 34 via an elongated tube 36 that is fluidly connected thereto. A source 38 of pressurized gas for this purpose is connected to the tube 36, an electrically operated air valve (switch) 39 being provided for controlling air flow from the source to the tube. The source 38 of pressurized gas is controlled by control unit 20 via output line 24. As a result of the energization of the control unit by closing of switch 22, the switch 39 is actuated (valve 39 opened) via output line 24 to effectuate the supplying of a stream of pressurized gas to the interior of the sleeve 34 via tube 36. That is, the control unit 20 has means (not shown) that, upon being actuated after the closing of the switch 22, initially actuates the valve 39 to start the flow of gas to the gap between the cutting nozzle and the electrode and about one second after the start of the air flow, the control unit acting through the output lines 23 and 26 closes the electrically operated switch 49 in one of the AC input lines of the low voltage direct current (DC) power supply unit 16 and closes switch 48 via control line 23. Thus the low voltage is available at the torch head so as to provide a pilot arc once a spark is provided in the gas stream flowing through the torch head. About 0.1 of a second after the energization of the low voltage power supply, the high voltage direct current (DC) power supply unit 18 is energized by the control unit closing the electrically operated switch 41 via the connection 25 for a short period of time, desirably about 0.25 to 0.5 seconds, and then the switch 41 opens. Switch 41 is provided in one of the power input lines of the high voltage power supply unit.

A weak arc 40 between the electrode 30 and the nozzle 32 is established by the high voltage DC (direct current) power supply 18 with the voltage being applied or initiated by the energization of the high voltage power supply unit that results from the closing of the electrically operable pilot switch 41, which may be of an electromagnetic or solenoid or solid-state type, controlled by the control unit 20 via output line 25.

A conductor 44 connects the junction 47 which is connected to the positive terminal of the high voltage power supply unit 18, to the cutting nozzle 32, and a conductor 46 connects the negative side of the unit 18 to the electrode 30. The low voltage DC (direct current) power supply unit 16 is arranged in parallel with the high voltage DC (direct current) power supply unit 18. The parallel arrangement is formed by (1) the connection of the conductor 46 to the negative side of each of the unit 16 and the unit 18, and (2) the connection of the positive side of the unit 16 to the junction 47 via the electrically operable pilot switch 48, pilot resistor 60 and a high voltage diode 50 with junction 47. Switch 48 is controlled by the control unit 20 via the output line 23 thereof.

During the brief time switch 41 and 48 are closed, as referred to above, switch 48 is closed by control unit 20 via output line 23 and is maintained closed for, advantageously, about 3 seconds. Diode 50 has the dual function of (1) preventing the short circuiting of the high voltage DC (direct current) power supply 18 through the low voltage power supply 16 when switches 41 and 48 are closed and (2) effecting the maintenance of the pilot arc 40 between the electrode 30 and the nozzle 32 via conductors 44 and 46 when switch 48 is closed and after switch 41 has been opened via control unit 20. Once the pilot arc is established, the pilot arc is maintained as long as the switch 48 is closed.

Workpiece 14 is provided with a voltage potential by being connected to the positive side of the low voltage DC (direct current) power supply unit 16 by a conductor 56. In operation, after the pilot arc 40 is established as described above, the torch 12 is moved into close proximity to the stationary workpiece 14 and, when close enough thereto (desirably about ¼"), a conductive path between the negatively charged electrode 30 and the positively charged workpiece 14 is established and the stream of pressurized air from the source 38 "blows" the pilot arc 40 towards the workpiece 14, and thereby establishes a main or working arc 57 between the electrode 30 and the workpiece 14. The pilot arc 40 is conveniently in the path of the stream of pressurized gas to facilitate the blowing of the pilot arc towards the workpiece 14.

In a preferred mode of operation the operating cycle is initiated by the manual closing of the switch 22 with the control unit immediately starting the flow of pressurized gas through the nozzle 32 by the closing of gas switch 39 via line 24. About one second after switch 22 is closed the switch 41 is closed for a period of about 0.5 to 2.5 seconds during which time a starting arc is established. That is, as a result of closing the switch 41, a spark is generated in the gap between the cutting nozzle and the electrode to ignite the gas flowing through the gap to initiate the pilot arc.

Switch 48 will be closed via control line 23 any time prior to the opening of the switch 41 (advantageously at about the same time or just shortly before switch 41 is closed) and will be effective to complete a circuit for the establishment and maintenance of the pilot arc 40 after switch 41 is opened. Switch 48 will be kept closed for a predetermined period of time during which time the operator has the opportunity to establish the main arc 57 by moving the torch 12 into a close enough proximity to the workpiece 14 (for example about ¼" from the workpiece) to effectuate the establishment and maintenance of the main (cutting) arc 57. This is effectuated by the resulting application of the output voltage of the low voltage supply unit 16 across the workpiece 14 and electrode 30 through conductors 56 and 46. Upon the operator discontinuing holding switch 22 in its closed position, the control unit is deenergized and accordingly the main arc is discontinued due to the deenergization of the low voltage power supply, and the flow of air to the gap is discontinued.

The magnitude of the predetermined period of time that switch 48 is kept closed, within the margins of providing a safety feature, is optional and a period on the order of three seconds is considered desirable. Switch 48 is opened automatically by control unit 20 after the three second period regardless of whether or not the main arc 57 is established during the three second period. If the main arc 57 is not established during that period, the torch unit 10 reverts to a standby status and the above described cycle of operation can again be initiated only by again closing of the switch 22 by the operator. Even though not preferred, it is to be understood the circuitry may be modified so that once the switch 48 is closed, it would remain in a closed position until the main arc is initiated or the opening of switch 22.

A pilot resistor 60 of sufficient resistance and wattage is provided in series with the switch 48 and the diode 50 to limit the current flow through the pilot arc and thus increase the life of the consumable parts of the torch head. With reference thereto, there may be provided 50 or more amps for the cutting arc, particularly if the metal being cut is relatively thick.

Upon allowing the switch 22 resiliently returning to its open position, the control unit accordingly opens switch 49 whereby the main arc is discontinued, and the air switch closed to block fluid flow from the source 38 to the gap between the cutting nozzle and the electrode.

Through the use of the DC (direct current) high voltage for initiating the pilot arc, electrical interference due to high frequency pulses the power supply is eliminated. Further the high voltage diode functions to block flow of high voltage energy to the main power supply 16 and thus reduces the load on the high voltage power supply and provides electrical isolation. Additionally, after the main cutting arc has been established, the pilot switch 48 opens to discontinue the application of the pilot arc across the cutting nozzle and the electrode. Also, due to the very short period of time that the switch 41 is closed, the amount of electromagnetic radiation from the head end of the torch that would exist independent of any type power supply when the starting arc is in existence, if any, is of a very short duration. Further, as the result of the use of the DC (direct current) power supply and the short period of time of the application of the high voltage, the wear and tear to the consumable parts of the torch head is reduced, and thus the parts last longer.

What is claimed is:

1. A plasma arc system, comprising, a manually movable cutting torch and a workpiece with said torch being in movable relation to said workpiece, said torch having an electrode and a cutting nozzle in surrounding relation thereto forming a gap, means for supplying and effecting a stream of ionizable pressurized gas toward and through said gap, a higher voltage direct current power supply unit and a lower direct current voltage power supply unit, a first circuit section including said higher voltage direct current power supply unit and a first electrically operated switch means that is operable to a closed position for applying a voltage from the higher voltage direct current power supply unit across said gap for establishing a starting arc across said gap when the first switch means is closed, and being operable to an open position, said higher voltage direct current power supply unit having a positive side thereof connected to said cutting nozzle, a second circuit section that includes said lower voltage direct current power supply unit in series with a second electrically operated switch means that is operable between an open and a closed position and a diode, said second circuit section being in parallel with said first circuit section relative to said gap changing said starting arc to a pilot arc, said lower voltage direct current power supply unit having a positive side thereof applicable to said cutting nozzle via said diode which is directed towards said nozzle, a controller and means for actuating said controller, said controller being connected to said first and second switch means in operable relation thereto, said controller having means for initially closing said first and second switch means and subsequently opening said first switch means after a short period of time that is sufficient to establish said starting arc, said low voltage direct current power supply unit being adequate to maintain said pilot arc via said second switch means and said diode after said first switch means is closed, and said workpiece being connected to the positive side of said low voltage direct current power supply unit so that a main arc can be established via the plasma phenomena when said torch is moved into proximity to said workpiece during the period of time that said second switch means is closed.

2. A plasma arc system according to claim 1, wherein the controller includes means for opening the second switch means after a predetermined period of time regardless of whether or not a main arc is established, the workpiece being electrically connected to the workpiece.

3. A plasma arc system according to claim 1, wherein the controller includes means for retaining the first switch means in a closed position for about 0.25–0.50 seconds and then opening the first switch means.

4. A plasma arc system according to claim 3 wherein the means for actuating the means for actuating the controller comprises a normal open switch member resiliently retained in an open position.

5. A method of operating a manually movable plasma cutting torch system of the type having an electrode and a cutting nozzle in surrounding relation thereto to form a gap, comprising the steps of, applying a high direct current voltage across said gap for a short period of time to form an arc across said gap, and replacing said high voltage across said gap with a lower direct current voltage to maintain an arc across said gap, the replacing step including applying the lower direct current voltage across the gap prior to discontinuing the application of the higher direct current voltage across the gap.

6. The method according to claim 5 wherein before the lower voltage replaces the high voltage, the step of discharging a pressurized gas through said gap, and after replacing the high voltage with the lower voltage, moving the electrode and nozzle sufficiently closely adjacent to a workpiece to establish a main arc between the electrode and the workpiece.

7. The method according to claim 6 wherein after a lower voltage replaces the high voltage, discontinuing the application of the lower voltage across the gap in the event the electrode and cutting nozzle has not been moved sufficiently closely adjacent to a workpiece to establish a main arc between the gap and the workpiece within a preselected period of time.

8. A plasma arc cutting system, comprising, a manually movable cutting torch and a metal workpiece with said torch being in movable relation to said workpiece, said torch having an electrode and a cutting nozzle in surrounding relation thereto forming a gap, means for supplying and effecting a stream of ionizable pressurized gas flow toward and through said gap, a higher voltage direct current power supply unit and a lower voltage direct current power supply unit that each has a first terminal and a second terminal, first conduit means for electrically connecting the first terminals of the higher and lower voltage power supply units to the electrode, second conduit means for electrically connecting the second terminal of the lower voltage power supply unit to the workpiece, the first and second conduit means applying a low voltage from the lower voltage supply across the cutting nozzle and the electrode to establish and maintain a main arc between the electrode and the workpiece after a pilot arc has been established between the electrode and the cutting nozzle and the cutting nozzle has been moved within a preselected distance from the workpiece, third conduit means for electrically connecting the second terminal of the higher voltage power supply unit to the cutting nozzle, interruptable means electrically connected across one of the second terminal of the lower voltage supply unit and the second conduit means, and one of the cutting nozzle and the third conduit means for providing an electrical circuit to apply a low voltage from the lower voltage supply unit to the cutting nozzle for establishing and maintaining a pilot arc across the gap after the establishment of a pilot arc and opening the electric circuit after the establishment of a main arc from the electrode to the workpiece, the interruptable means including a pilot switch operable between an open and a closed positions and an unidirectional electrical conductive means connected in series to apply the low voltage from the lower voltage supply unit to the cutting nozzle when the pilot switch is closed while blocking the application of a voltage from the higher voltage unit to the workpiece, and control means for controlling the application of a high voltage from the higher voltage power unit across the cutting nozzle and the electrode via the first and third conduit means to establish a starting arc across the gap and after a short period of time, discontinue the application of the high voltage across the electrode and the cutting nozzle, and closing the pilot switch one of shortly before and while the high voltage is applied across the cutting nozzle and the electrode to establish a pilot arc and maintain the pilot arc once established even after the discontinuance of the application of the high voltage across cutting nozzle and the electrode and open the pilot switch once the main arc has been established.

9. The plasma arc cutting system of claim 8 wherein the control means includes timing circuit operated means for maintaining a high voltage across the cutting nozzle and electrode for about 0.25-0.5 seconds and the pilot switch closed for about 3 seconds independent of the establishment of a main arc.

10. The plasma cutting system of claim 8 wherein the unidirectional means comprises a high voltage diode to block high voltage being applied to the low voltage supply unit while allowing the application the low voltage across the gap.

11. The plasma cutting system of claim 10 wherein the control means includes electrical controlled switch means that is operable between a closed position for applying the high voltage from the higher voltage supply unit across the cutting nozzle and the electrode via the first and third conduit means and an open position to discontinue the application of the higher voltage, a control unit for operating the electrical controlled switch means to its closed position upon power being applied to the control unit and then after a short period of time opening the electrical controlled switch means, and a manually operated switch for selectively applying power to the control unit.

12. The plasma cutting system of claim 11 wherein the control unit has means for maintaining the electrical controlled switch means closed for a period of time that is about 0.25 to 0.5 seconds.

13. The plasma cutting system of claim 11 wherein there is provided source means for supplying pressurized ionizable gas and the control means includes means for conducting gas from the source means upon the manually operated switch means applying a starting signal to the control unit and discontinuing the flow of gas upon the discontinuance of the application of the starting signal to the control unit.

14. The plasma cutting system of claim 11 wherein the pilot switch is electrically operated and the control means includes means for operating the pilot switch to its closed position for about 3 seconds and thence opening the pilot switch.

15. A method of operating a manually movable plasma cutting torch system of the type having an electrode and a cutting nozzle in surrounding relation thereto to form a gap for cutting a workpiece, comprising the steps of, applying a high DC voltage across the electrode and the cutting nozzle to form a starting arc across said gap, discontinuing the application of the high DC voltage across the electrode and the cutting nozzle, applying a low DC voltage across the electrode and each of the nozzle and the workpiece prior to discontinuing the application of the high DC voltage to temporarily provide a pilot arc after the starting arc is formed, and after the formation of the starting arc and the step of applying a low DC voltage, moving the torch toward the workpiece to establish a main arc between the electrode and the workpiece, the discontinuance of the application of the high DC voltage being prior to the establishment of the main arc.

16. A plasma arc cutting system, comprising, a manually movable cutting torch and a metal workpiece with said torch being in movable relation to said workpiece, said torch having an electrode and a cutting nozzle in surrounding relation thereto forming a gap, means for supplying an deffecting a stream of ionizable pressurized gas flow toward and through said gap, a higher voltage direct current power supply unit and a lower voltage direct current power supply unit that each has a first terminal and a second terminal, first conduit means for electrically connecting the first terminals of the higher and lower voltage power supply units to the electrode, second conduit means for electrically connecting the second terminal of the lower voltage power supply unit to the workpiece, the first and second conduit means applying a low voltage from the lower voltage supply across the cutting nozzle and the electrode to establish and maintain a main arc between the electrode and the workpiece after a pilot arc has been established between the electrode and the cutting nozzle and the cutting nozzle has been moved within a preselected distance from the workpiece, third conduit means for electrically connecting the second terminal of the higher voltage power supply unit to the cutting nozzle, circuit means electrically connected across one of the second terminal of the lower voltage supply unit and the second conduit means, and one of the cutting nozzle and the third conduit means for providing an electrical circuit to apply a low voltage from the lower voltage supply unit to the cutting nozzle for establishing and maintaining a pilot arc across the gap after the establishment of a starting arc and opening the electric circuit after the establishment of a main arc from the electrode to the workpiece, and control means for controlling the application of a high voltage from the higher voltage power unit across the cutting nozzle and the electrode via the first and third conduit means to establish a starting arc across the gap and after a short period of time, discontinue the application of the high voltage across the electrode and the cutting nozzle, and controlling the circuit means to one of shortly before and while the high voltage is applied across the cutting nozzle and the electrode, establish the pilot arc and maintain the pilot arc once established even after the discontinuance of the application of the high voltage across cutting nozzle and the electrode from the higher voltage power unit.

* * * * *